United States Patent
Tiramani et al.

(10) Patent No.: US 10,823,273 B2
(45) Date of Patent: Nov. 3, 2020

(54) GEARBOX MOUNTING SYSTEM

(71) Applicant: Auto IP LLC, Las Vegas, NV (US)

(72) Inventors: Paolo Tiramani, Las Vegas, NV (US);
Kyle Denman, North Las Vegas, NV (US)

(73) Assignee: Auto IP LLC, Las Vegas, NV (US)

(*) Notice: Subject to any disclaimer, the term of this patent is extended or adjusted under 35 U.S.C. 154(b) by 56 days.

(21) Appl. No.: 16/168,978

(22) Filed: Oct. 24, 2018

(65) Prior Publication Data

US 2019/0128398 A1 May 2, 2019

Related U.S. Application Data

(60) Provisional application No. 62/735,966, filed on Sep. 25, 2018, provisional application No. 62/616,601, (Continued)

(51) Int. Cl.
*F16H 57/025* (2012.01)
*B60K 17/08* (2006.01)
(Continued)

(52) U.S. Cl.
CPC .......... *F16H 57/025* (2013.01); *B60K 17/06* (2013.01); *B60K 17/08* (2013.01); *F16H 3/089* (2013.01);
(Continued)

(58) Field of Classification Search
CPC .... F16H 57/025; F16H 3/089; F16H 61/0025; F16H 2057/0203; B60K 17/06; B60K 17/08; B60K 2005/003
See application file for complete search history.

(56) References Cited

U.S. PATENT DOCUMENTS 1,824,440 A * 9/1931 Meyer ............... F16F 15/315
74/606 R
3,455,409 A * 7/1969 Clark ................. B60K 17/04
180/271
(Continued)

OTHER PUBLICATIONS

NPL-1 "Homemade Bellhousing Project" (Grassroots Motorsports) Feb. 2, 2011 (Feb. 2, 2011) entire forum, including pp. 1-2. URL; https:llgrassrootsmotorsports.com/fol ulll/yr lll/tlornemade-bellhousing-projectl31440/page1.
(Continued)

*Primary Examiner* — Drew J Brown
(74) *Attorney, Agent, or Firm* — McCarter & English, LLP

(57) ABSTRACT

A combination of an engine, a gearbox clutch housing and a mounting system for mounting the combination to the structural load-bearing components of a vehicle, comprising an engine having a first contact surface; a gearbox clutch housing having a second contact surface, the first contact surface of the engine and the second contact surface of the gearbox clutch housing each being joined to the other by mechanical fastening means; and a first hanger, where the latter comprises a rigid plate positioned between the first contact surface of the engine and the second contact surface of the gearbox clutch housing, with the first hanger being securely fastened between the engine and the gearbox clutch housing. The first hanger has first and second opposed load-transferring surfaces of closed perimeter, with the first of the load-transferring surfaces being in pressing contact with the first contact surface of the engine and the second of the load-transferring surfaces being in pressing contact with the second contact surface of the gearbox clutch housing. The first hanger includes one or more load-supporting members extending beyond the perimeter of the opposed load-transferring surfaces; and the one or more load-sup-
(Continued)

porting members include plural spaced-apart fastening elements adapted for coupling to one or more select structural load-bearing components of a vehicle.

8 Claims, 13 Drawing Sheets

Related U.S. Application Data filed on Jan. 12, 2018, provisional application No. 62/577,965, filed on Oct. 27, 2017, provisional application No. 62/577,423, filed on Oct. 26, 2017.

(51) Int. Cl.
  *B60K 17/06* (2006.01)
  *F16H 3/089* (2006.01)
  *F16H 61/00* (2006.01)
  *F16H 57/02* (2012.01)
  *B60K 5/00* (2006.01)

(52) U.S. Cl.
  CPC .... *F16H 61/0025* (2013.01); *B60K 2005/003* (2013.01); *F16H 2057/0203* (2013.01)

(56) References Cited

U.S. PATENT DOCUMENTS

| | | | | |
|---|---|---|---|---|
| 3,696,689 | A | 10/1972 | Senter et al. | |
| 3,772,938 | A * | 11/1973 | Johnson | F02F 7/0073 |
| | | | | 74/606 R |
| 3,841,290 | A * | 10/1974 | Schubeck | F02F 7/0073 |
| | | | | 123/195 A |
| 5,184,524 | A | 2/1993 | Senia | |
| 5,473,808 | A * | 12/1995 | Winters, Sr. | F02F 7/0073 |
| | | | | 123/195 C |
| 8,556,591 | B2 | 10/2013 | Koronkiewicz | F03D 80/00 |
| | | | | 416/244 R |
| 8,561,283 | B1 * | 10/2013 | McCombs | F16H 57/025 |
| | | | | 29/558 |
| 8,590,662 | B2 * | 11/2013 | Lee | B60K 17/06 |
| | | | | 180/312 |
| 10,054,168 | B2 * | 8/2018 | McCombs | B21D 22/16 |
| 10,502,306 | B1 * | 12/2019 | McCombs | F16H 57/025 |
| 2001/0001995 | A1 * | 5/2001 | Izumi | B60K 5/1216 |
| | | | | 180/291 |
| 2009/0095558 | A1 | 4/2009 | Bigg et al. | |
| 2009/0301429 | A1 * | 12/2009 | Takashina | F02B 67/06 |
| | | | | 123/197.5 |
| 2012/0186386 | A1 * | 7/2012 | McCombs | F16F 15/30 |
| | | | | 74/572.21 |
| 2015/0210319 | A1 | 7/2015 | Tiramani | |

OTHER PUBLICATIONS

NPL-2 "Homemade Bellhousing Project" (Grassroots Motorsports) Feb. 2, 2011 (Feb. 2, 2011) entire forum, ncluding pp. 1-2. URL; https:llgrassrootsmotorsports.com/fol ulll/yr lll/tlornemade-bellhousing-projectl31440/page2.

NPL-3 Facebook Post: "Sneak Peak!" (Supercar System) Feb. 3, 2017 (Feb. 3, 2017) entire post. URL: https://www.facebook.com/SupercarSystem/photos/a.270478103112285/727402677419823/?type=3&eid=ARDG2-KFk41UQIRovu_QiqMh2AzuxIJ2x2Z8qSoipv-6ZjbCh3XpxGxOUzOdSYcFgUel3vw9saUms_BO&_tn_=EHH-R.

NPL-4 International Search Report and Written Opinion of the International Searching Authority in PCT/US2018/057222, dated Jan. 7, 2019.

U.S. Appl. No. 16/168,957, filed Oct. 24, 2018, Paolo Tiramani et al.

NPL-1 "Homemade Bellhousing Project" (Grassroots Motorsports) Feb. 2, 2011 (Feb. 2, 2011) entire forum, including pp. 1-2. URL; https:llgrassrootsmotorsports.com/fol ulll/yr Ill/tlornemade-bellhousing-projectl31440/page1.

NPL-2 "Homemade Bellhousing Project" (Grassroots Motorsports) Feb. 2, 2011 (Feb. 2, 2011) entire forum, including pp. 1-2. URL; https:llgrassrootsmotorsports.com/fol ulll/yr Ill/tlornemade-bellhousing-projectl31440/page2.

NPL-3 Facebook Post: "Sneak Peak!" (Supercar System) Feb. 3, 2017 (Feb. 3, 2017) entire post. URL: https://www.facebook.com/SupercarSystem/photos/a.270478103112285/727402677419823/?type=3&eid=ARDG2-KFk41UQIRovu_QiqMh2AzuxIJ2x2Z8qSoipv-6ZjbCh3XpxGxOUzOdSYcFgUel3vw9saUms_BO&_tn_=EHH-R.

U.S. Appl. No. 16/579,554, filed Sep. 23, 2019, Paolo Tiramani et al.

U.S. Appl. No. 16/579,524, filed Sep. 23, 2019, Paolo Tiramani et al.

U.S. Appl. No. 16/579,571, filed Sep. 23, 2019, Paolo Tiramani et al.

U.S. Appl. No. 16/589,308, filed Oct. 1, 2019, Paolo Tiramani et al.

* cited by examiner

GEARBOX MOUNTING SYSTEM

CROSS-REFERENCES TO RELATED APPLICATIONS

This application claims the benefit of U.S. Provisional Application No. 62/577,423, filed Oct. 26, 2017, U.S. Provisional Application No. 62/577,965, filed Oct. 27, 2017, U.S. Provisional Application No. 62/616,601, filed Jan. 12, 2018 and U.S. Provisional Application No. 62/735,966, filed Sep. 25, 2018.

BACKGROUND OF THE INVENTION

Field of the Invention

This invention relates to systems for securing a gearbox to the structural portions of a vehicle.

Description of the Related Art

Gear systems are used in order to better match the torque, power and rotational speed characteristics of a rotating power source with the needs of the application. In the case of gearboxes used in connection with internal combustion engines for automotive applications, current designs may employ a 3-point system for mounting the gearbox and engine in the vehicle. For example, for a front engine, rear wheel drive vehicle, the engine may be secured to the vehicle chassis at two locations transversely spaced from the vehicle longitudinal centerline. In addition, the clutch/gearbox assembly (which is joined to the engine) may be secured to the vehicle chassis at a third location generally located on or proximate the vehicle longitudinal centerline. Other powertrain configurations may also employ a 3-point mounting arrangement, although the exact mounting points may differ depending on the specific configuration.

A drawback of 3-point mounting design is that it creates high local stress at the mounting points. It further provides relatively limited flexibility in utilizing a particular engine/gearbox combination, potentially requiring the structural portions of the vehicle to be designed to accommodate the engine/gearbox mounting. Further, a 3-point mounting design treats the engine/gearbox combination as dead load that must be borne by the structural portions of the vehicle.

SUMMARY OF THE INVENTION

The present invention provides a system for mounting a gearbox in a vehicle that is both economical and easily adaptable to a wide number of vehicle constructions, including ladder-chassis, exoskeleton/space frame and others. The present invention not only strongly secures the gearbox (and the engine) to the vehicle, but beneficially contributes to increased vehicle torsional rigidity.

In automotive vehicles using for example internal combustion engines, an increase or decrease in crankshaft speed and engine torque can cause the engine to twist in its mounts, which can in turn twist the vehicle structure itself, thereby deleteriously impacting vehicle handling. The present invention reduces this deleterious impact by rigidifying the structure of the vehicle—by, in effect, transforming the gearbox/engine combination (including the clutch housing) into an integral member of the chassis/structural elements of the vehicle. More specifically, the present invention strengthens the torsional rigidity of the vehicle, which improves vehicle handling by reducing the chassis twist occasioned by rapid throttle action. This beneficial increase in torsional rigidity also acts to reduce chassis twist occasioned by non-engine induced bending, such as is caused by cornering loads. Further, the mounting system described herein among other benefits better distributes the stress of the mounting points in a circular fashion about the gearbox and the engine block.

In one aspect, the present invention is directed to a combination of an engine, a gearbox clutch housing and a mounting system for mounting the combination to the structural load-bearing components of a vehicle, where the combination comprises an engine having a first contact surface; a gearbox clutch housing having a second contact surface, the first contact surface of the engine and the second contact surface of the gearbox clutch housing each being joined to the other by mechanical fastening means; and a first hanger comprising a rigid plate positioned between the first contact surface of the engine and the second contact surface of the gearbox clutch housing. The first hanger has first and second opposed load-transferring surfaces of closed perimeter, with the first of the load-transferring surfaces being in pressing contact with the first contact surface of the engine, and the second of the load-transferring surfaces being in pressing contact with the second contact surface of the gearbox clutch housing. The first hanger includes one or more load-supporting members extending beyond the perimeter of the opposed load-transferring surfaces; and the one or more load-supporting members including plural spaced-apart fastening elements adapted for coupling to one or more select structural load-bearing components of a vehicle.

These and other aspects of the present invention are described in the drawings annexed hereto, and in the description of the preferred embodiments and claims set forth below.

DETAILED DESCRIPTION OF THE PREFERRED EMBODIMENTS

Figure 1:
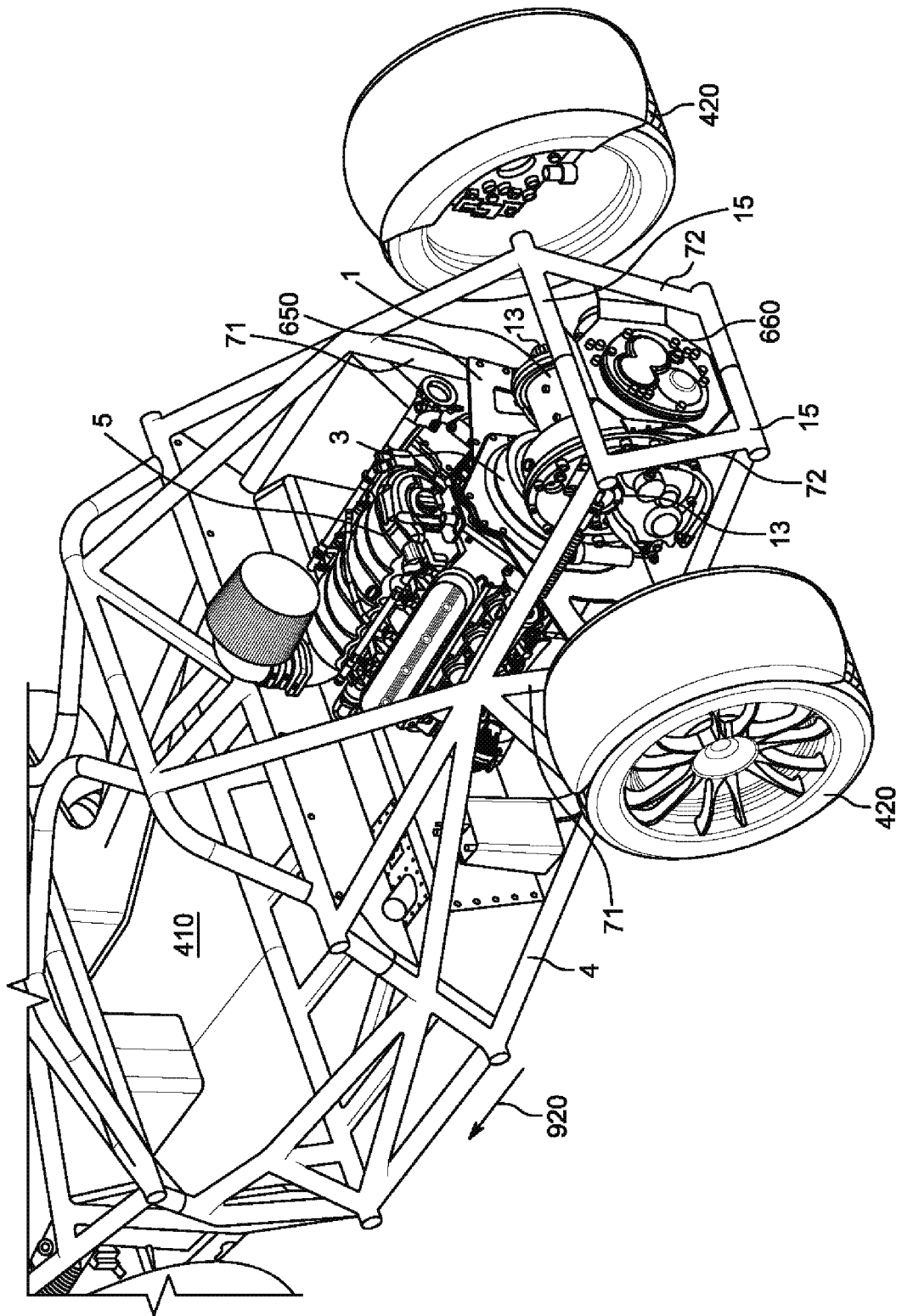
FIG. 1 is a schematic perspective view of a vehicle having an exoskeleton/space frame and which includes the gearbox mounting system of the present invention, without body panels and without certain other components for purposes of illustration.

In the embodiment of the present invention depicted in FIG. 1, there is shown a vehicle 4 having an engine 5, a clutch housing 3 and a gearbox 1. Vehicle 4 is a four-wheeled vehicle, with rear wheels 420 shown in FIG. 1, and with the two front wheels of vehicle 4 omitted for clarity. Gearbox 1 as shown in FIG. 1 is a transaxle design, integrating in one housing both primary engine gearing and the gearing used to differentially rotate the driving wheels. Vehicle 4 as shown is a mid-engine, rear wheel drive configuration with the engine 5 located to the rear of the passenger compartment 410 and ahead of the rear axle, and with the gearbox 1 mounted rearward of the engine 5. The output shafts 13 of gearbox 1, which in the embodiment of FIG. 1 are approximately oriented in the horizontal plane, are connected to two axle shafts (not shown), to rotate rear wheels 420 and propel the vehicle.

Figure 6A:
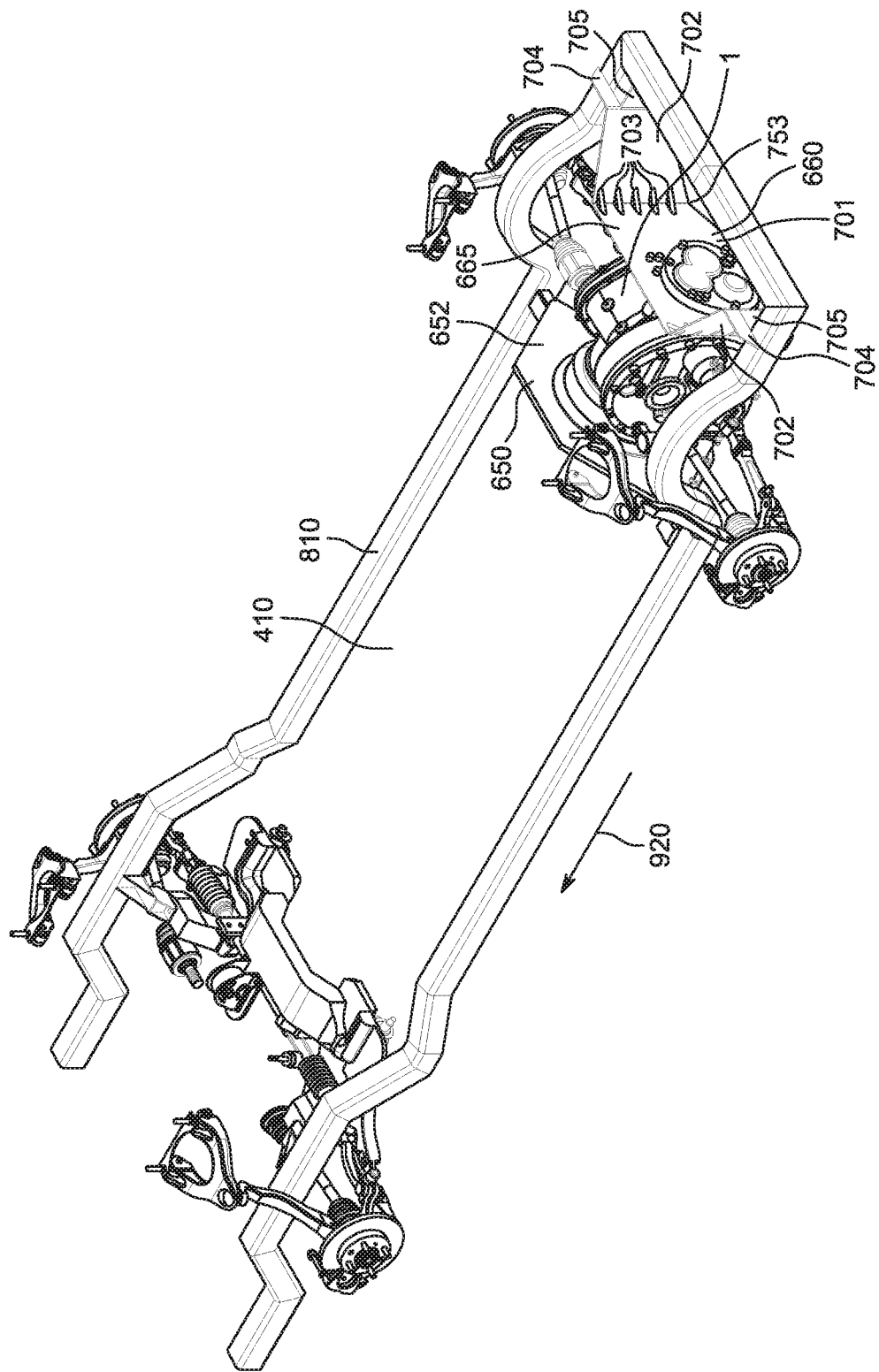
FIGS. 6A and 6B are schematic perspective views of a vehicle having a ladder chassis and which includes the gearbox mounting system of the present invention, without body panels, wheels and without certain other components for purposes of illustration.
Figure 6B:
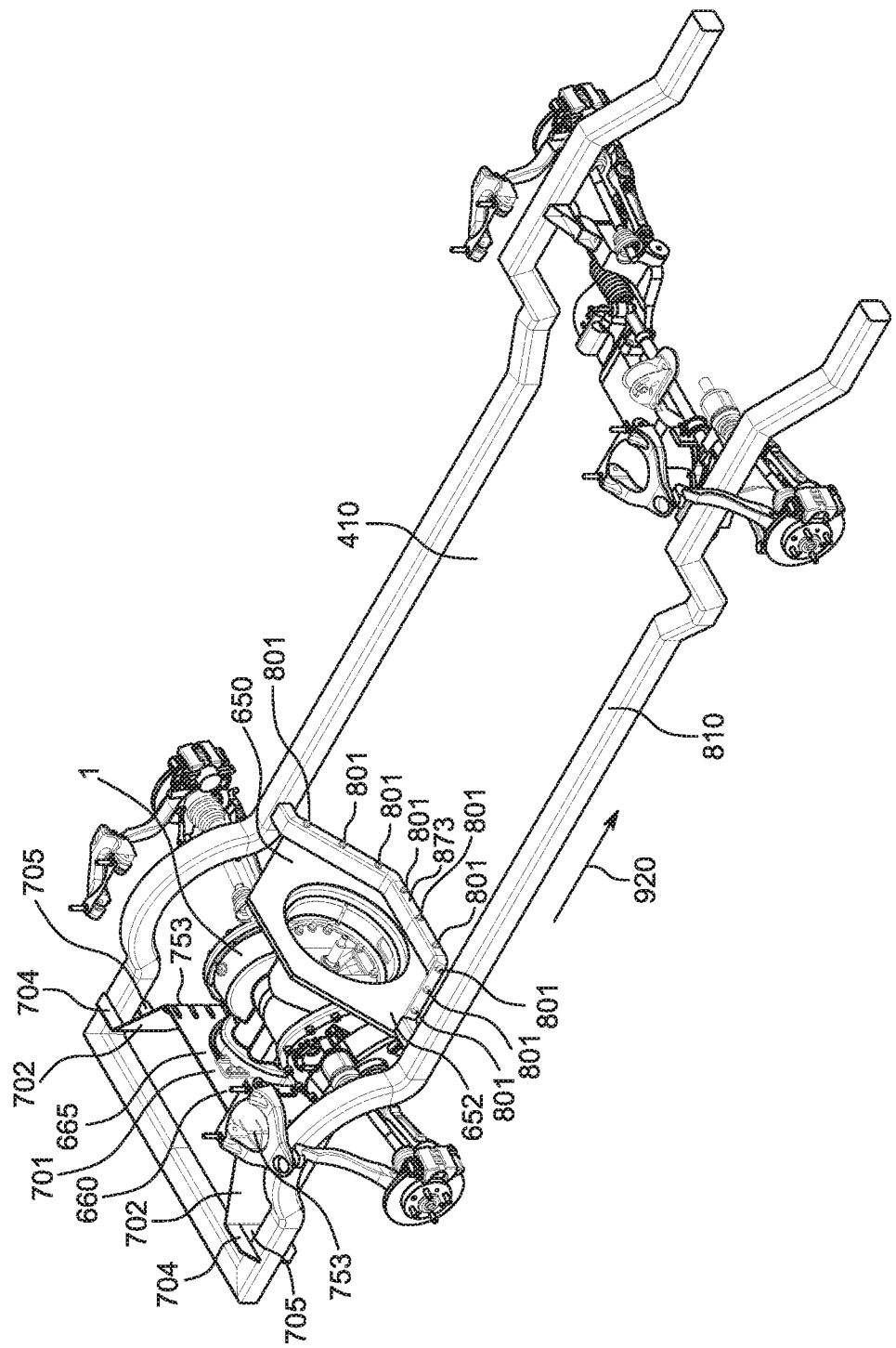

In this disclosure, the direction of vehicle forward travel is indicated by arrow 920, shown in FIGS. 1, 6A and 6B. Accordingly, references in this disclosure to the "forward end" or to the "forward" portion of any component or assemblage, and similar references, refer to the portion of the component or assemblage oriented most closely to the head of arrow 920, and reference in this disclosure to the "rearward end," or to the "rearward" or "rear" portion of any component or assemblage, and similar references, refer to the portion of the component or assemblage oriented least closely to the head of arrow 920. Furthermore, statements in this disclosure that a plane or component is "principally" oriented in the vertical direction, or "principally" oriented vertically, or like statements, means that the plane or component is oriented within 45 degrees of perpendicular to the surface on which the vehicle travels, and includes orientations exactly perpendicular as well as approximately perpendicular to that surface; likewise, statements that a plane or component is "principally" oriented in the horizontal direction, or "principally" oriented horizontally, or like statements, means that the plane or component is oriented within 45 degrees of parallel to the surface on which the vehicle travels, and includes orientations exactly parallel as well as approximately parallel to that surface.

Engine-Clutch Housing Assembly.

Figure 2A:
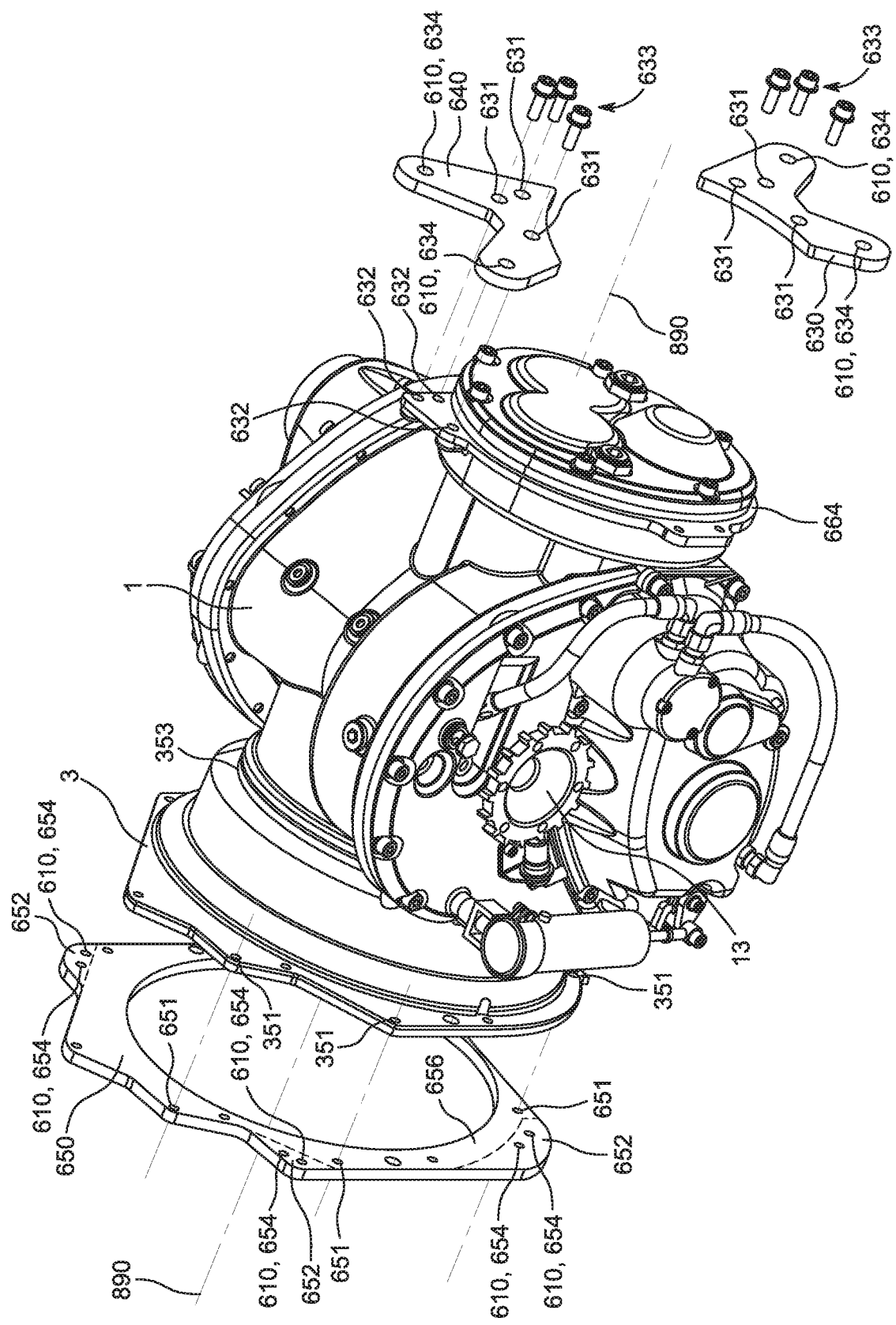
FIG. 2A is a schematic perspective view of a gearbox and clutch housing showing in exploded form a first embodiment of the mounting system of the present invention.
Figure 2B:
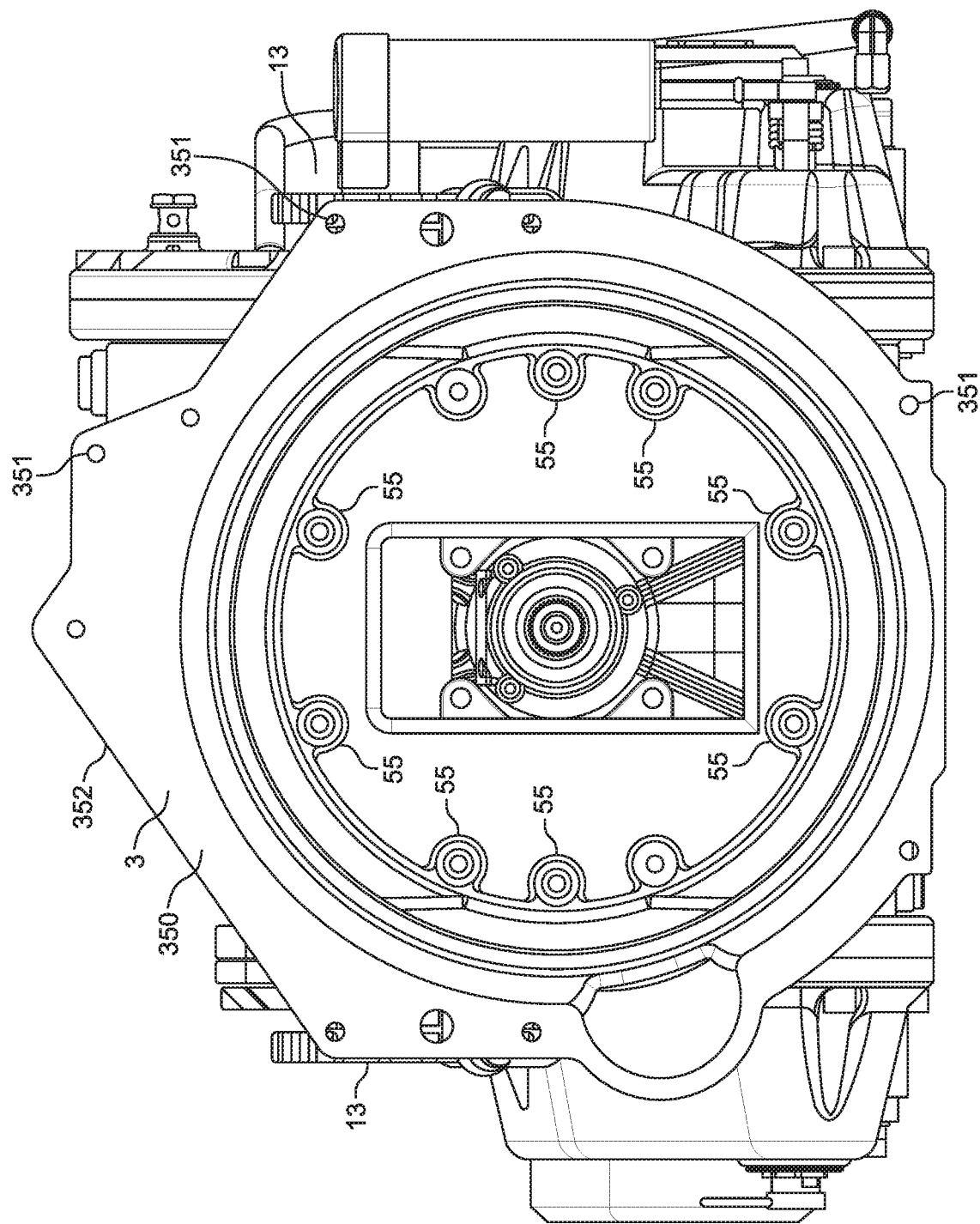
FIG. 2B is a front view of an exemplary gearbox.

FIGS. 1 and 2A show among other things gearbox 1 and clutch housing 3. A clutch assembly (not shown) is contained within clutch housing 3. The forward end of clutch housing 3 is fastened with plural bolts (not shown) to the rearward end of engine 5 (FIG. 1). FIG. 2B shows the generally annular contact surface on the forward end of clutch housing 3, denoted clutch mounting face 350, which is a planar generally annular surface that is positioned against a corresponding planar generally annular contact surface at the rearward end of engine 5. The exterior edge of the generally annular contact surface at the rearward end of engine 5 is generally coincident with the perimeter of the rearward end of engine 5, and the exterior edge of clutch mounting face 350 is generally coincident with the perimeter 352 of the forward end of clutch housing 3. The two contact surfaces joining engine 5 and clutch housing 3 are annular (not solid across their circumference) to permit at least one power transmission shaft to pass between them, and in the embodiment of FIG. 1 are approximately oriented in a vertical geometrical plane, and are approximately orthogonal to the longitudinal axis 890 of gearbox 1, which axis (shown in FIG. 2A) is approximately parallel to the direction of travel of vehicle 4.

Clutch Housing-Gearbox Assembly.

As shown in FIGS. 1 and 2A, the rearward end of clutch housing 3 is fastened to the forward end of gearbox 1. In particular, the forward end of gearbox 1 has a generally annular contact surface that is fastened with plural bolts 55 (visible in FIG. 2B) to a corresponding generally annular contact surface located at the rearward end of clutch housing 3. The exterior edge of the generally annular contact surface at the rearward end of clutch housing 3 is generally coincident with the perimeter of the rearward end of clutch housing 3, and the exterior edge of the forward end of gearbox 1 is generally coincident with the perimeter of the forward end of gearbox 1. These contact surfaces joining gearbox 1 and clutch housing 3 are annular (not solid across their circumference) to permit at least one power transmission shaft to pass between them, and in the embodiment of FIG. 1 are approximately oriented in a vertical geometrical plane and are approximately orthogonal to the longitudinal axis 890 of gearbox, 1 which axis in FIG. 1 is approximately parallel to the direction of travel of vehicle 4. Parting line 353 depicted in FIG. 2A circumscribes the perimeter of each of these contact surfaces joining gearbox 1 and clutch housing 3.

A gearbox 1 as shown in the figures generally corresponds with a gearbox design set forth in U.S. Provisional Patent Application No. 62/577,423 filed Oct. 26, 2017, in U.S. Provisional Patent Application No. 62/577,965, filed Oct. 27, 2017 and in U.S. patent application Ser. No. 16/168,957 entitled "Invertible Reversible Multi-Application Gearbox," having the same inventors as the subject application and filed on the same date as the subject application. The contents of U.S. Provisional Patent Application No. 62/577,423 relating to gearbox design are hereby incorporated by reference as if fully set forth herein, and the contents of U.S. Provisional Patent Application No. 62/577,965 relating to gearbox design are hereby incorporated by reference as if fully set forth herein. Further, the contents of U.S. patent application Ser. No. 16/168,957 entitled "Invertible Reversible Multi-Application Gearbox," having the same inventors as the subject application and filed on the same date as the subject application, are hereby incorporated by reference as if fully set forth herein, including the aspects relating to gearbox design, such as found for example at paragraphs 27-51, 53-54, 56-60 and FIGS. 1-5. However, the inventions set forth in this disclosure are applicable to gearbox designs more generally. In addition, the inventions set forth in this disclosure are applicable to engine/clutch/gearbox combinations more generally, particularly those which are designed or adapted to have one or more output shafts that are principally oriented in the horizontal plane and where the engine/clutch/gearbox combination has two or more subassemblies or portions that are joined together, and separable, by means of bolts, screw threads or other such mechanical fastening means, along contact surfaces principally oriented in a vertical plane, including such vertical planes as are orthogonal to the direction of travel of the vehicle, and such vertical planes as are aligned with the direction of travel of the vehicle.

First Gearbox Hanger

FIG. 2A shows first gearbox hanger 650, which is mounted to the forward end of clutch housing 3 and the rearward end of engine 5 (not shown in FIG. 2A), depicted in exploded form in FIG. 2A for ease of reference. In the embodiment shown, first gearbox hanger 650 is a rigid generally planar plate, approximately oriented in a vertical plane when mounted, with two opposed generally planar load-transferring surfaces 656; one of these load-transferring surfaces 656 faces clutch 3, as shown in FIG. 2A, and the other of these load-transferring surfaces 656 (not visible) faces engine 5.

First gearbox hanger 650 in this embodiment is adapted to be attached between the front of clutch housing 3 and the rear of engine 5. In particular, bolts are passed through each of the apertures 351 and 651 in clutch housing 3 and first gearbox hanger 650 respectively, which are received in correspondingly located apertures at the rear of engine 5 and then torqued with threaded nuts to tightly sandwich generally planar load-transferring surfaces 656 within the engine/gearbox combined structure. Alternatively, first gearbox hanger 650 can be bolted between any two subassemblies or portions of gearbox 1 that are separable along a principally vertical plane of separation of gearbox 1, such as the plane containing parting line 353 which demarcates clutch housing 3 from gearbox 1. In general, it is preferred that the portions of first gearbox hanger 650 defining the generally planar load-transferring surfaces 656 be of unitary design with a closed perimeter and with load-transferring surfaces 656 substantially coextensive in extent with the full circumference of each of the opposing contact surfaces of clutch housing 3 and engine 5, so as to define a generally ovoid aperture, as shown in the embodiment of FIG. 2A.

Figure 2C:
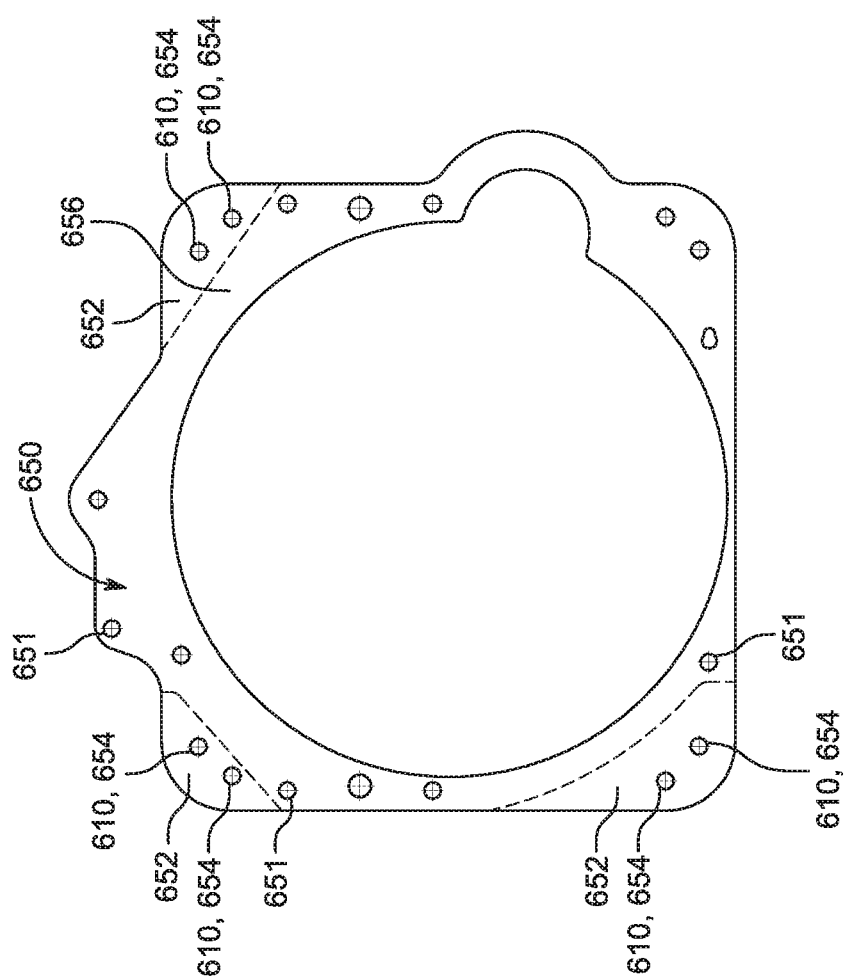
FIG. 2C depicts a plan view of a first gearbox hanger in accordance with the present invention.

First gearbox hanger 650 in the embodiment of FIGS. 2A-2C includes generally planar load-supporting members 652 that extend beyond the perimeter of the load-transferring surfaces 656 and beyond the perimeters of clutch mounting face 350 and the contact surface at the rearward end of engine 5, as generally defined by the dashed lines shown on first gearbox hanger 650 in FIGS. 2A and 2C. These generally planar load-supporting members 652 have plural spaced-apart fastening elements 610 adapted for attachment of first gearbox hanger 650 to one or more structural load-bearing portions or components of a vehicle. In particular, in the embodiment shown in FIGS. 2A and 2C first gearbox hanger 650 is adapted to be bolted to appropriate structural portions of vehicle 1. As shown in FIGS. 2A and 2C, first gearbox hanger 650 includes plural fastening elements 610, specifically spaced-apart apertures 654, to permit hanger 650 to be bolted to appropriate structural portions of the vehicle. The number and locations of these apertures 654 can vary in accordance with the particular vehicle, and may be omitted if alternative means are used for securing first gearbox hanger 650 to appropriate structural portions of vehicle 1, such as by welding, in which case the regions of hanger 650 to which welds are made comprise the fastening elements.

The geometry in plan of first gearbox hanger 650 is not limited to the specific geometry of the embodiment shown in FIGS. 2A and 2C, but can be varied to facilitate mounting to suitable structural portions and components of a particular vehicle. Thus load-supporting members 652 can extend beyond the perimeters of load-transferring surfaces 656 to a degree greater than shown in FIGS. 2A and 2C, including by having load-supporting members 652 extend beyond those perimeters at all points, to result in a single continuous load-supporting member 652, as mounting considerations may make desirable. Further, portions of generally planar load-supporting members 652 can be bent at suitable locations, orientations and angles to facilitate fastening to appropriate structural portions or components of the vehicle, can be formed and assembled from more than one piece of planar material, and can be provided with lightening holes and/or cut-outs at relatively low stress portions to facilitate service and facilitate routing of electrical, hydraulic, fuel, oil and pneumatic lines, as well as further lighten the structure, depending upon the particular design.

First gearbox hanger 650 constitutes means for rigidly mounting gearbox 1 (and engine 5 as well) to appropriate structural portions of the vehicle, such as select tubular members of vehicle 4 shown in FIG. 1, and additionally serves as means to structurally strengthen the vehicle. Although first gearbox hanger 650 shown for example in FIGS. 1 and 2A is in general design a planar plate, its principally vertical orientation when mounted results in a relatively rigid structure for resisting vertical loads due to engine/gearbox weight and shock loads. The coextensive relationship between the load-transferring surfaces 656 of hanger 650 and the contact surfaces of clutch housing 3 and engine 5 provides the ability to distribute these vertical loads about the circumference of the engine/gearbox assembly, and to regions distal from the points at which first gearbox hanger 650 is mounted to the structural load-bearing portions of the vehicle. Additionally, the generally planar design provides the ability to attach first gearbox hanger 650 at multiple attachment points using plural fastening elements 610, or even continuously, as by welding, in horizontal, diagonal and vertical directions.

In the embodiment of FIG. 1, it is preferred that a sealing gasket be interposed between the first gearbox hanger 650 and clutch housing 3, and also between first gearbox hanger 650 and engine 5. These sealing gaskets can be made of rubber-fiber, rubber-cork, rubber-cellulose or the like, or a compound such as RTV silicone rubber.

Additional Gearbox Hangers

FIG. 2A further shows bottom mounting hanger 630 and top mounting hanger 640. Each of these hangers is a rigid generally planar plate fabricated approximately in the shape of a "V". Each of hangers 630 and 640 as shown in the embodiment of FIG. 2A is approximately oriented in the vertical plane when mounted, and preferably is mounted distal in the horizontal plane from first gearbox hanger 650. Accordingly, in the embodiment shown in FIGS. 2A and 2D, bottom mounting hanger 630 and top mounting hanger 640 each have a forward-facing generally planar load-transferring surface 635 (see FIG. 2D) that when mounted is in contact with the generally planar rearward facing surface of a mounting ring 664 of gearbox 1. In the design of gearbox 1 depicted in the FIG. 2A, mounting ring 664 is approximately oriented in the vertical plane, and bottom mounting hanger 630 and top mounting hanger 640 are distal in the horizontal plane from first gearbox hanger 650, with first gearbox hanger 650 being positioned proximate the front of gearbox 1 and hangers 630, 640 being positioned proximate the rear of gearbox 1.

Bottom mounting hanger 630 and top mounting hanger 640 are adapted to be attached to a suitable location proximate the rear of gearbox 1, which in FIG. 2A is mounting ring 664. More particularly, in FIG. 2A bolts 633 are passed through apertures 631 in hangers 630, 640, which are received in correspondingly located threaded apertures 632 in mounting ring 664 and then torqued to tightly press the load-transferring surfaces 635 of hangers 630, 640 against the rearward facing surface of mounting ring 664.

Figure 2D:
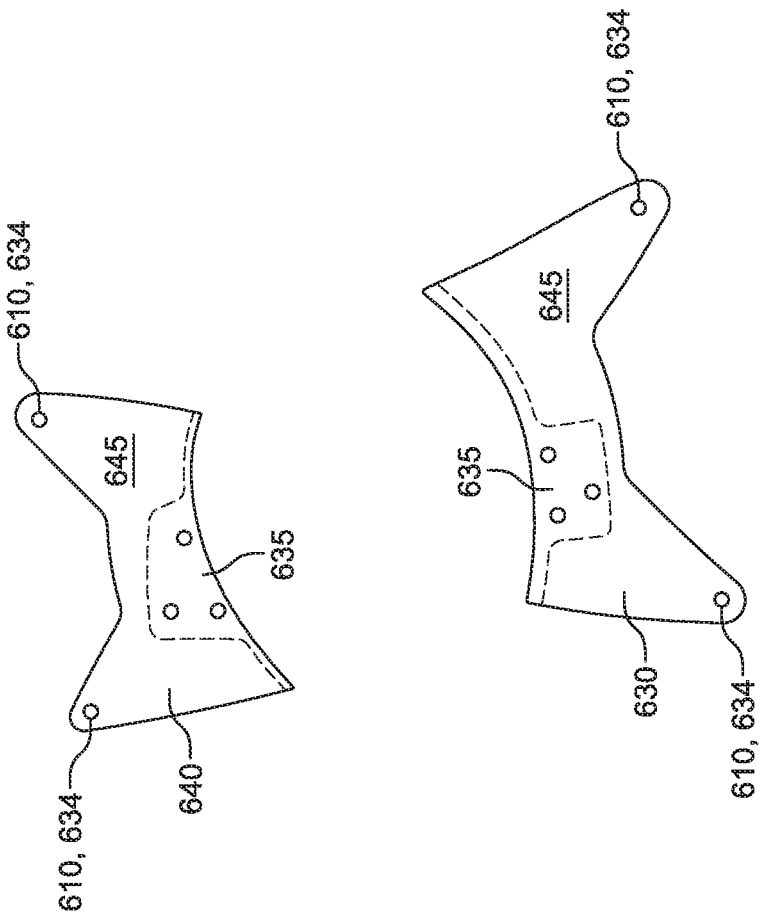
FIG. 2D depicts plan views of top and bottom mounting hangers in accordance with the present invention.

Referring to FIG. 2D, each of bottom mounting hanger 630 and top mounting hanger 640 include generally planar load-supporting members 645 that extend beyond the perimeter of the load-transferring surface 635, as generally defined by the dashed lines shown on hangers 630 and 640 in FIG. 2D. Each of these generally planar members 645 provide plural spaced-apart fastening elements 610 for attachment of hangers 630, 640 to one or more structural load-bearing portions or components of a vehicle. In particular, bottom mounting hanger 630 and top mounting hanger 640 are each adapted to be bolted to appropriate structural portions or components of vehicle 1. As shown in FIGS. 2A and 2D, bottom mounting hanger 630 include plural fastening elements 610, specifically spaced-apart apertures 634, to permit hanger 630 to be bolted to appropriate structural portions of the vehicle. Likewise as shown in FIGS. 2A and 2D, top mounting hanger 640 include plural fastening elements 610, specifically spaced-apart apertures 634, to permit hanger 640 to be bolted to appropriate structural portions or components of the vehicle. The number and locations of these apertures 634 can vary in accordance with the particular vehicle, and may be omitted if alternative means are used for securing bottom mounting hanger 630 and top mounting hanger 640 to appropriate structural portions of vehicle 1, such as by welding, in which case the regions of hangers 630, 640 to which welds are made comprise the fastening elements.

The geometry in plan of bottom mounting hanger 630 and top mounting hanger 640 are not limited to the specific geometry of the embodiment shown in FIGS. 2A and 2D, but can be varied depending on the locations of suitable structural portions or components of a particular vehicle. Further, portions of load-supporting members 645 of bottom mounting hanger 630 and top mounting hanger 640 each can include one or more bends at suitable locations, orientations and angles to facilitate fastening to appropriate points of the structural portions of the vehicle, can be formed and assembled from more than one piece of planar material, and can be provided with lightening holes and/or cut-outs at relatively low stress portions to facilitate service and facilitate routing of electrical, hydraulic, fuel, oil and pneumatic lines, as well as further lighten the structure, depending upon the particular design.

Bottom mounting hanger 630 and top mounting hanger 640 constitute further means for rigidly mounting gearbox 1 (and engine 5 as well) to appropriate structural portions of the vehicle, such as select tubular members of vehicle 4 shown in FIG. 1, and additionally serve as means to structurally strengthen the vehicle. Although hangers 630, 640 in FIG. 1 are in general design planar plates, their principally vertical orientation when mounted results in a relatively rigid structure for resisting vertical loads due to engine/gearbox weight and shock loads. The coextensive relationship between the load-transferring surfaces 635 and rearward facing surface of mounting ring 664 further provide the ability to distribute the vertical loads about the circumference of the engine/gearbox assembly beyond a single point of contact, depending upon the particular design.

In lieu of hangers 630 and 640, an alternative embodiment of the present invention utilizes a drop gear hanger 660. In the embodiment shown in FIGS. 3A and 3B, drop gear hanger 660 is a rigid generally planar plate, approximately oriented in the vertical plane when mounted. Drop gear hanger 660 has a forward-facing generally planar load-transferring surface 667 that when mounted is in contact with the rearward facing surface of mounting ring 664 of gearbox 1. Drop gear hanger 660 preferably is mounted distal in the horizontal plane from first gearbox hanger 650. Thus in the design of gearbox 1 depicted in the FIG. 3A, mounting ring 664 is approximately oriented in the vertical plane, and drop gear hanger 660 is distal in the horizontal plane from first gearbox hanger 650, with first gearbox hanger 650 being positioned proximate the front of gearbox 1 and drop gear hanger 660 being positioned proximate the rear of gearbox 1.

Figure 3A:
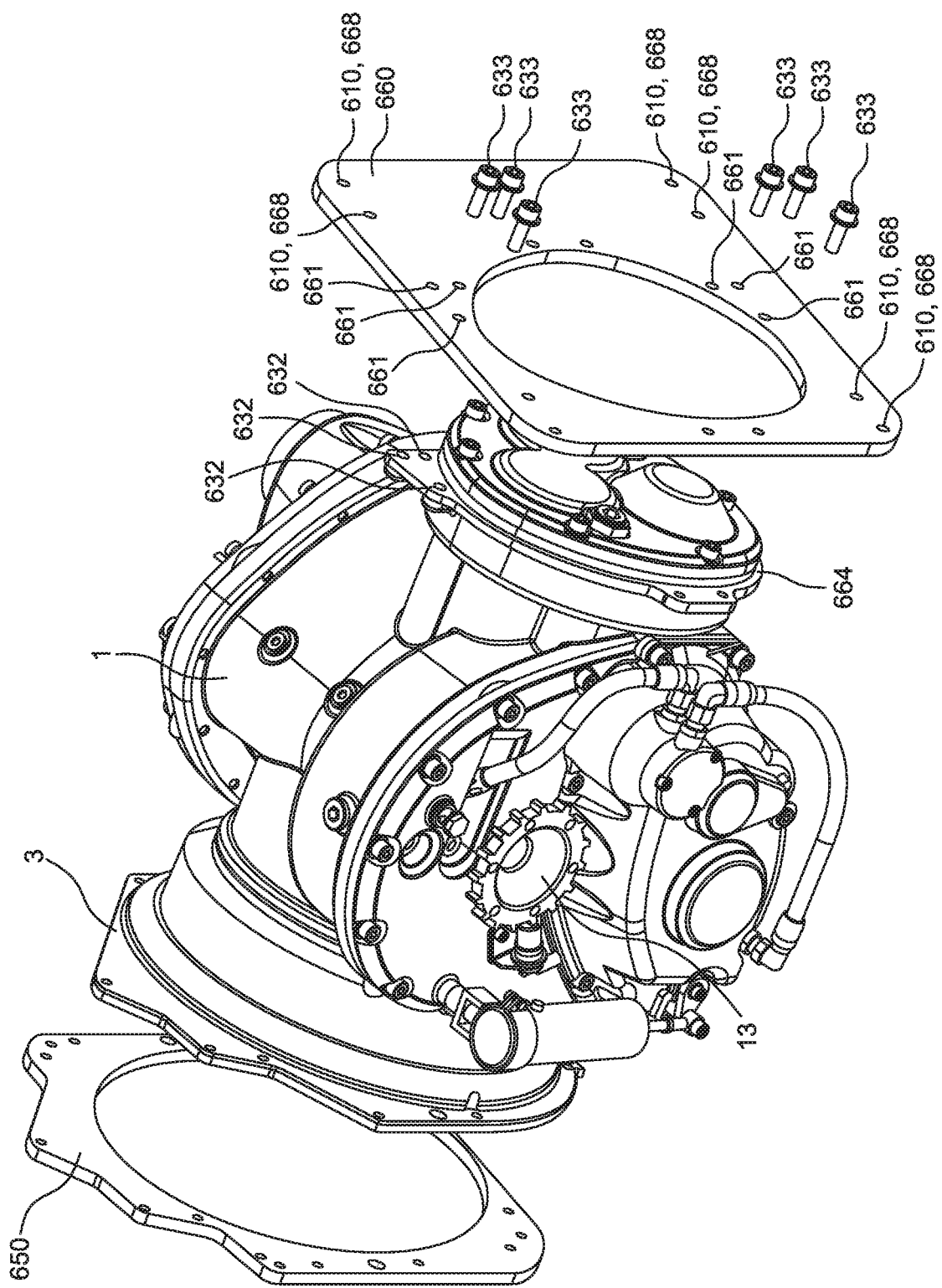
FIG. 3A is a schematic perspective view of a gearbox and clutch housing showing in exploded form a second embodiment of the mounting system of the present invention.

Drop gear hanger 660 is adapted to be attached proximate the rear of gearbox 1, which in FIG. 3A is mounting ring 664. More particularly, in FIG. 3A bolts 633 are passed through plural apertures 661 defined by drop gear hanger 660, which bolts are received in correspondingly located threaded apertures 632 in mounting ring 664 and then torqued to tightly press the load-transferring surface 667 against the rearward facing surface of mounting ring 664. In general, it is preferred in this embodiment that the generally planar load-transferring surface 667 of drop gear hanger 660 be closed about its perimeter and coextensive in extent with the full circumference of the opposing contact surface of mounting ring 664, so as to define an ovoid aperture, as shown in the embodiment of FIGS. 3A and 3B.

Figure 3B:
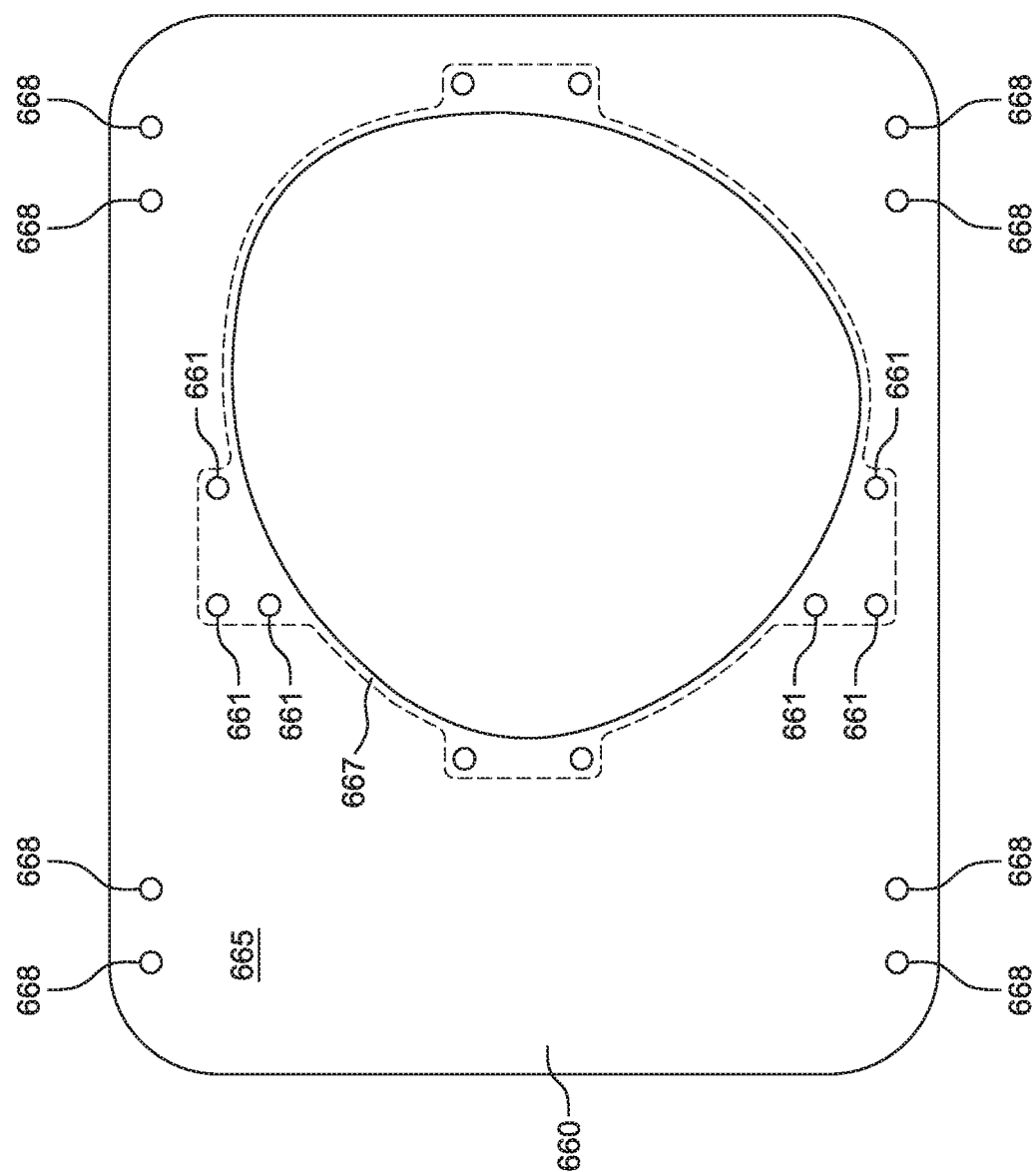
FIG. 3B is a plan view of a drop gear hanger in accordance with the present invention.

Referring to FIG. 3B, drop gear hanger 660 includes generally planar load-supporting member 665 that extends at all points in this embodiment beyond the perimeter of the load-transferring surface 667, as generally defined by the dashed line shown on hanger 660 in FIG. 3B. This generally planar load-supporting member 665 provides plural spaced-apart fastening elements 610 for attachment of drop gear hanger 660 to one or more structural load-bearing portions or components of a vehicle. In particular, in the embodiment shown in FIGS. 3A and 3B drop gear hanger 660 is adapted to be bolted to appropriate structural portions of vehicle 1. As shown in FIGS. 3A and 3B, drop gear hanger 660 includes plural fastening elements 610, specifically spaced-apart apertures 668, to permit hanger 660 to be bolted to appropriate structural portions of the vehicle. The number and locations of these apertures 668 can vary in accordance with the particular vehicle, and may be omitted if alternative means are used for securing drop gear hanger 660 to appropriate structural portions of vehicle 1, such as welding, in which case the regions of hanger 660 to which welds are made comprise the fastening elements.

The geometry in plan of drop gear hanger 660 is not limited to the embodiment shown in FIG. 3B, but can be varied depending on the locations of suitable structural portions or components of a particular vehicle. Thus generally planar load-supporting member 665 can extend beyond the perimeter of load-transferring surface 667 at select sectors of that perimeter only, to result in plural load-supporting members 665. Further, load-supporting member 665 can be bent at suitable locations, orientations and angles to facilitate fastening to appropriate points of the structural portions of the vehicle, can be formed and assembled from more than one piece of planar material, and can be provided with lightening holes and/or cut-outs at relatively low stress portions to facilitate routing electrical, hydraulic, fuel, oil and pneumatic lines, as well as further lighten the structure, depending upon the particular design.

Drop gear hanger 660 constitutes yet further means for rigidly mounting gearbox 1 (and engine 5 as well) to appropriate structural portions of the vehicle, such as select tubular members of vehicle 4 shown in FIG. 1, and additionally serves as means to structurally strengthen the vehicle. Notably, the principally vertical orientation of drop gear hanger 660 when mounted results in an extremely rigid structure for resisting vertical loads due to engine/gearbox weight and shock loads. Further, its coextensive load-transferring relationship with mounting ring 664 provides the ability to distribute these vertical loads about the circumference of the rearward portion of gearbox 1, and to regions distal from the points at which drop gear hanger 660 is mounted to the structural load-bearing portions of vehicle 4. Additionally, the generally planar design provides the ability to attach drop gear hanger 660 at multiple attachment points (or even continuously, as by welding), in both horizontal, diagonal and vertical directions.

Yet further, first gearbox hanger 650, in combination with either hangers 630, 640 or hanger 660, not only serves to secure the engine/gearbox to the vehicle, but beneficially imparts torsional rigidity to the vehicle frame, by in practical effect transforming the engine/gearbox into a vehicle structural component. In particular, the desire to make a vehicle as light as possible necessarily requires the designer to accommodate some torsional flexibility in the vehicle, which impacts vehicle handling adversely. In contrast however, a vehicle engine/clutch housing/gearbox combination is typically made of robust forged and/or cast metallic parts that exhibit substantial torsional rigidity. The present invention capitalizes on this substantial torsional rigidity by, in effect, transforming the engine/clutch housing/gearbox from a dead load into an integral member of the chassis/structural elements of the vehicle.

More specifically, in one preferred embodiment of the present invention, the engine/clutch housing/gearbox combination is mounted to the vehicle structure by utilizing at least two rigid plates principally oriented in the vertical plane and distal from each other in the horizontal plane. The foregoing mounting structure and arrangement adds the substantial torsional rigidity of the engine/clutch housing/gearbox combination to the overall torsional rigidity of the vehicle, which improves vehicle handling by reducing the chassis twist induced by rapid throttle action. This beneficial increase in torsional rigidity also acts to reduce chassis twist occasioned by non-engine induced vehicle twisting and bending, such as is caused by cornering loads. In general, the nature of the designs of hangers 630, 640, 650 and 660 (generically referred to herein as hangers 600) beneficially reduce points of high stress.

Hangers 600 are preferably fabricated from aluminum plate having a high strength-to-density ratio, for example the 7000 series aluminum alloys such as 7075 T6. Because hangers 600 are plate, they are relatively light in weight, but can carry comparative large vertical loads given their principally vertical orientation, such as the weight of the engine/gearbox combination, plus such additional loads as may be induced by road shock. Further, hangers 600 can be cut from plate stock in various sizes and configurations with relative ease, using for example laser cutting techniques. When fabricated from such plate stock, appropriate portions of hangers 600 can additionally be bent, formed and assembled from more than one piece of material, and/or provided with lightening holes, as referenced previously. The thickness of hangers 600 is selected to provide a desired degree of robustness, in accordance with design. Thus hangers 600 in accordance with the present invention can accommodate a large number of different vehicle structural configurations in accordance with design choice, and lend themselves to economic use by smaller fabrication shops.

Figure 4:
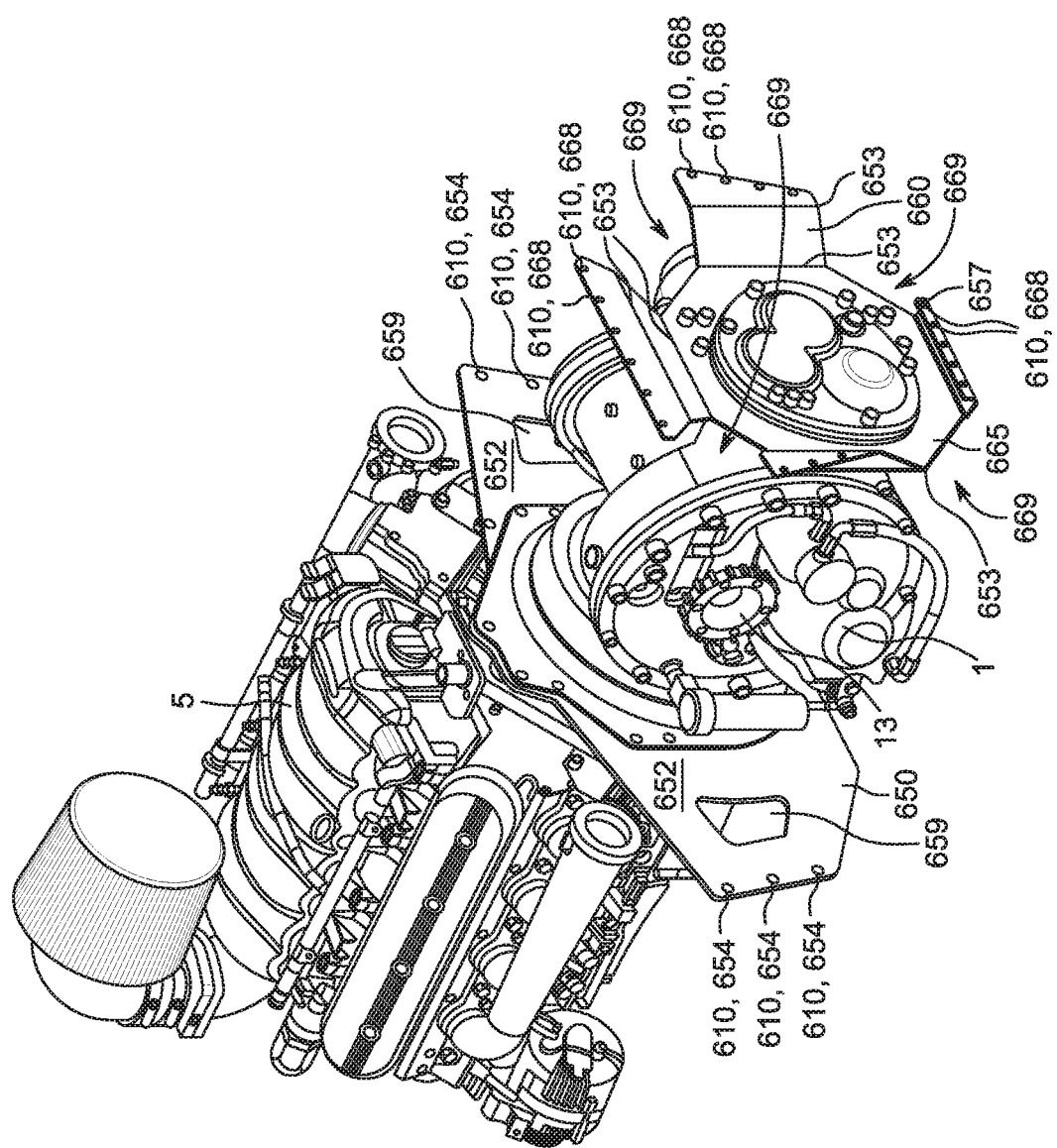
FIG. 4 is a schematic perspective view of the engine and gearbox depicted in FIG. 1, to illustrate in greater detail the first gearbox hanger and drop gear hanger utilized in the embodiment of FIG. 1.

In FIG. 1 for example, there is shown a gearbox 1 with a first gearbox hanger 650 and a drop gear hanger 660 of the present invention mounted to a vehicle 4 that has a tubular exoskeleton/space frame design. The specific geometrical configuration of hangers 650 and 660 in the FIG. 1 embodiment is shown for clarity in FIG. 4. As shown in FIG. 4, generally planar load-supporting members 652 of first gearbox hanger 650 extend transversely to each side of gearbox 1/engine 5 and have lightening holes 659.

Correspondingly, generally planar load-supporting member 665 of drop gear hanger 660 is depicted in FIG. 4 as extending transversely to each side of gearbox 1 and also vertically above and below gearbox 1. Load-supporting member 665 has cut-outs 669 in each of its four corners and contains multiple bends 653 to facilitate mounting of load-supporting member 665 to select structural tubular members. For more acute angles, a right angle section such as tab 657 shown in FIG. 4, can be riveted, bolted or welded to planar load-supporting member 665 (and to planar load-supporting members 652, as warranted).

In FIG. 4, plural fastening elements 610, specifically apertures 654, are positioned proximate the edges of members 652 distal from gearbox 1. Apertures 654 are thru-bolted to upright tubular members 71, which are shown in FIG. 1. Additional plural fastening elements 610, specifically apertures 668, are positioned proximate to the edges of generally planar load-supporting member 665 distal from gearbox 1. Apertures 668 are thru-bolted to upright tubular members 72 and to transverse tubular members 15.

Figure 5A:
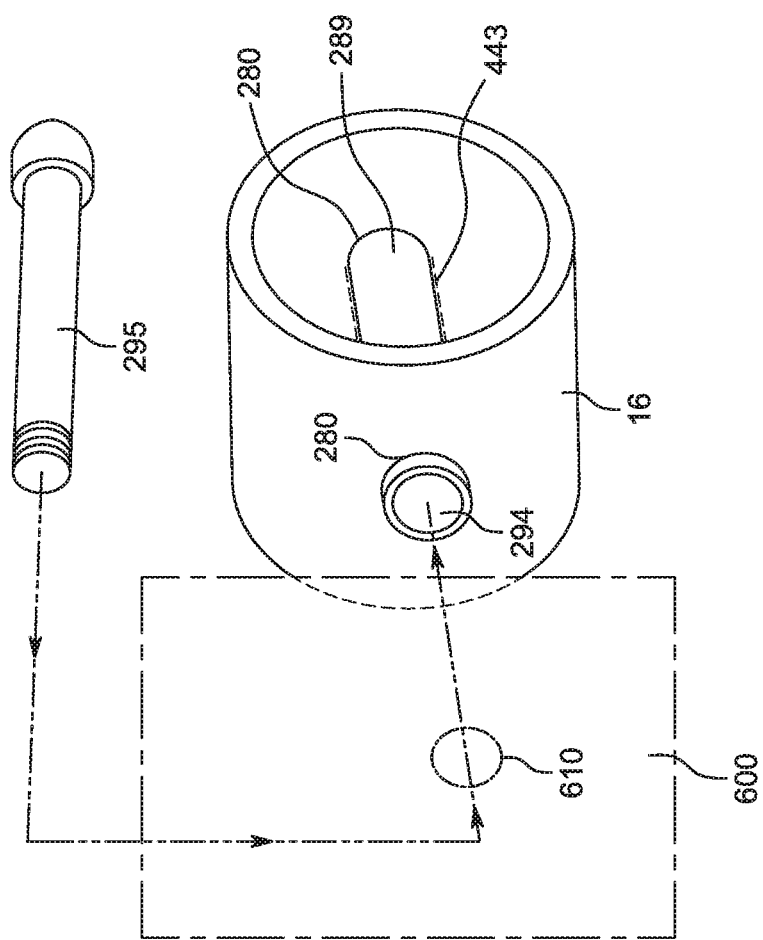
FIG. 5A depicts means for securing a hanger of the present invention to a tubular member of a vehicle, including a boss to be utilized in connection therewith.

A preferred embodiment for implementing this thru-bolting, and more generally for securing any of hangers 600 to a tubular member, is shown in FIG. 5A. As shown in FIG. 5A, a transverse passage 443, bounded and defined by opposed circular apertures 280, is preferably formed in a tubular member 16 (exemplary of tubular members 71, 15 and 72, for example). Each circular aperture 280 preferably is oriented across from the other along a diameter of tubular member 16; i.e., each aperture 280 is generally orthogonal to the axial centerline of member 16. A cylindrical member having a bore 294, namely boss 289, is inserted through either aperture 280 to be positioned in transverse passage 443. As a general design rule, the length of boss 289 should be approximately the same as, or greater than, the outside diameter of tubular member 16, such that it extends through tubular member 16 when inserted through circular apertures 280. Boss 289 is preferably welded in place to tubular member 16, at each of circular apertures 280, to fix boss 289 in place in tubular member 16. As shown in FIG. 5A, a threaded bolt 295 is then inserted through a fastening element 610 of a hanger 600 (depicted as a rectangle for illustrative purposes), and further inserted through bore 294 of boss 289. Bolt 295 is then secured for example with a threaded nut, thereby securing hanger 600 to tubular member 16. Alternatively, each boss 441 can be threaded, in which case the threaded nut can be omitted.

Figure 5B:
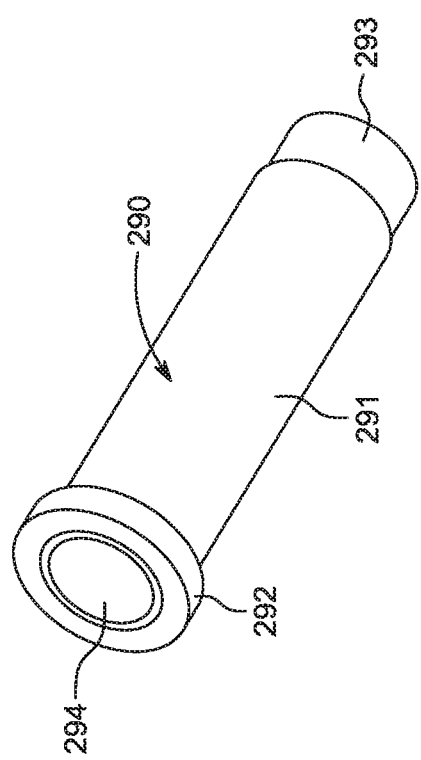
FIGS. 5B and 5C depicts an alternative embodiment of a boss.
Figure 5C:
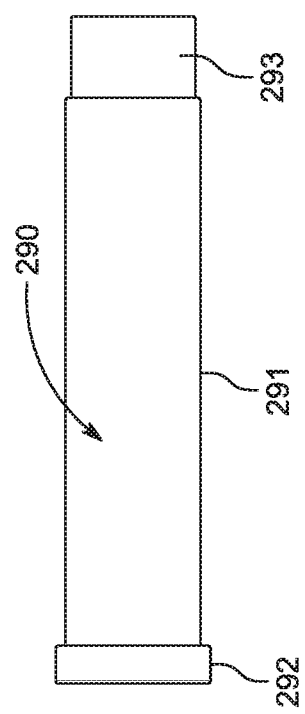
Figure 5D:
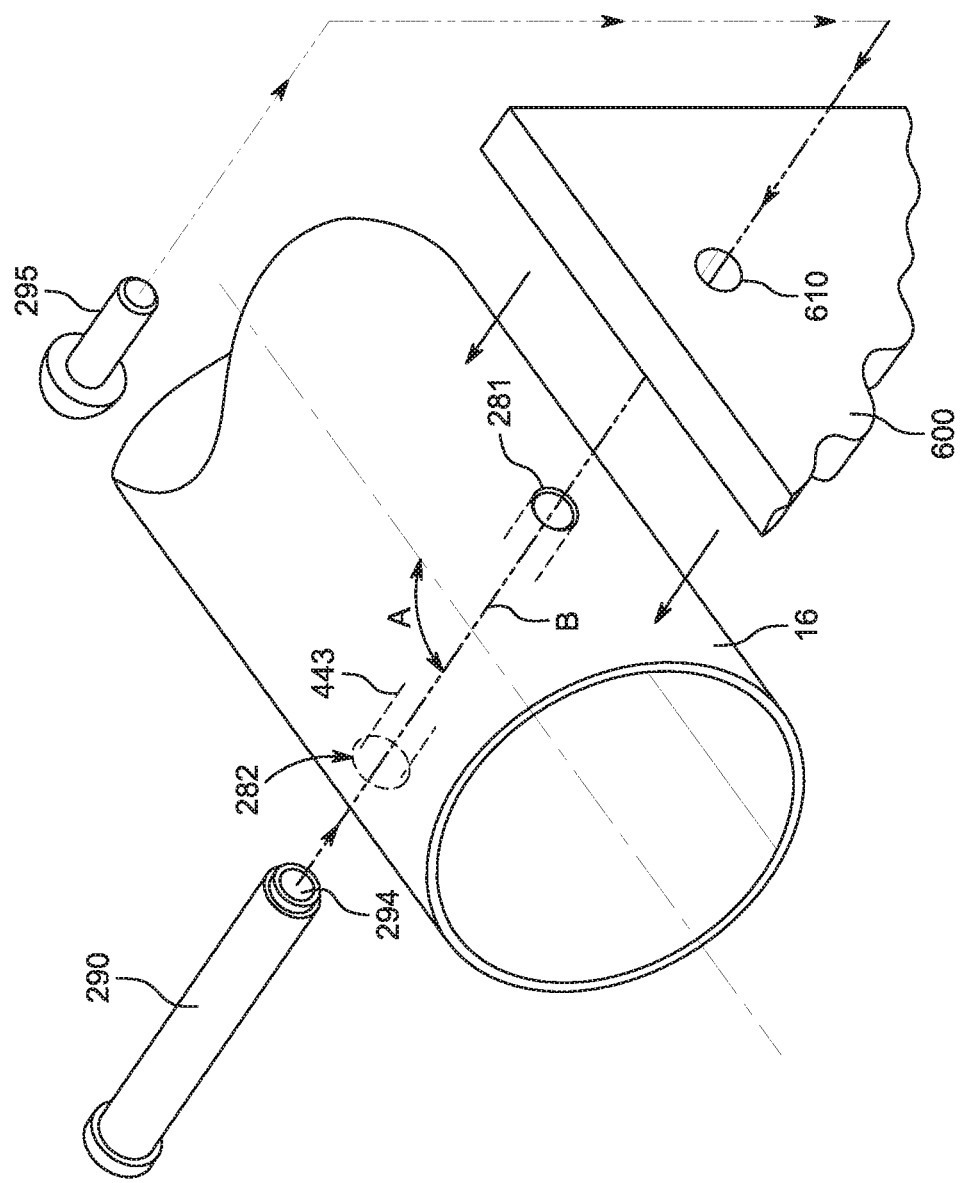
FIG. 5D depicts the utilization of this alternative embodiment to secure a hanger (depicted in cutaway form for purposes of illustration) in accordance with the present invention to a tubular member of a vehicle.

An alternative boss design is shown in FIGS. 5B and 5C. Referring to those figures, there is shown a boss 290. Boss 290 is to be received in transverse passage 443, bounded and defined by opposed apertures 281, 282 in tubular member 16, as shown in FIG. 5D. Apertures 281, 282 preferably are oriented across from each other along a diameter of tubular member 16; i.e., apertures 281, 282 are generally orthogonal to the axial centerline 283 of member 16, as shown in FIG. 5D (Angle A is approximately 90°), and are located along a diameter B (FIG. 5D) of tubular member 16.

Boss 290 has a shaft 291 that terminates in a flanged end 292. The length and diameter of boss 290 can be varied in accordance with the particular application for which it is used. As a general design rule, the length of shaft 291 should be approximately the same as, or greater than, the outside diameter of tubular member 16, such that it extends through tubular member 16 when inserted through apertures 281, 282 and the flanged end 292 is positioned against the outer surface of tubular member 16.

The end of boss 290 distal from flanged end 292, stepped end 293, preferably has a reduced diameter as compared to the diameter of shaft 291 between flanged end 292 and stepped end 293. The diameter of tube aperture 281 preferably is smaller than the diameter of tube aperture 282. Further, it is preferred that the diameter of shaft 291 between flanged end 292 and stepped end 293 be greater than the diameter of tube aperture 281 and slightly less than the diameter of tube aperture 282, and it is preferred that the diameter of stepped end 293 be slightly less than the diameter of tube aperture 281.

In accordance with the foregoing design preferences, boss 290 is self-aligning; i.e., boss 290 can be inserted into apertures 281, 282 from one direction only, and only up to the point where flange 292 comes into contact with the surface of tubular member 16. Therefore, utilizing a self-aligning anchor securing element, which in the preferred embodiment is boss 290 with the design features disclosed herein, facilitates component assembly and provides a measure of quality control during component assembly.

In the preferred embodiment, boss 290 is welded in place to tubular member 16, at flanged end 292 and at stepped end 293, to permanently fix it in place. Alternatively, boss 290 can be left unsecured to tubular member 16, relying on flanged end 292 to maintain it in proper position until the anchor/boss assembly is secured into place.

Boss 290 also has a bore 294 for receiving a removable fastener 295, such as a threaded bolt. Bore 294 can be threaded or smooth. If bore 294 is threaded, fastener 295 should be correspondingly threaded to permit fastener 295 to be secured tightly to boss 290. If bore 294 is smooth, fastener 295 should be of a length larger than the outside diameter of tube 16, such that when inserted in bore 294, the portion of fastener 295 protruding beyond tube 16 can be secured, such as by threading the protruding portion and securing it with a corresponding nut.

After boss 290 is placed in position in apertures 281, 282, any of hangers 600 are positioned proximate thereto and a fastener 295 is then inserted. Fastener 295 is thereafter fixed in position relative to the structure of tubular member 16; thus if bore 294 is threaded, fastener 295 is tightened to firmly secure the hanger in place. Boss designs generally corresponding to boss 290, as well as associated supporting elements and means for utilization of same, which are suitable for use as described herein, are disclosed in U.S. Provisional Application No. 62/735,966 entitled "Chassis Anchoring Systems" filed Sep. 25, 2018. The contents of U.S. Provisional Application No. 62/735,966 are hereby incorporated by reference as if fully set forth herein, including details disclosed regarding boss designs, associated supporting elements, and means for utilization of same, such as the aspects that for example correspond to paragraphs 59-65 and FIGS. 5A, 5B and 6 thereof, among others, of U.S. Provisional Application No. 62/735,966.

As another example of the versatility of the present invention, FIGS. 6A-6B show the present invention in a mid-engine, rear wheel drive vehicle 4 having a ladder chassis 810, with the engine (omitted from FIGS. 6A-6B for clarity) located to the rear of the passenger compartment 410 and ahead of the rear axle, and the gearbox 1 mounted rearward of the engine 5.

In particular, FIGS. 6A-6B show a single continuous generally planar load-supporting member 652 of first gearbox hanger 650, which extends above, below and transversely to each side of gearbox 1. As seen in FIG. 6B, the lower edge of load-supporting member 652 is thru-bolted at multiple transverse locations 801 to cross member 873 of ladder chassis 810 to rigidly secure gearbox 1 to ladder chassis 810.

Further, as seen in FIGS. 6A and 6B, load-supporting member 665 of drop gear hanger 660 extends transversely to each side of gearbox 1. In this embodiment, load-supporting member 665 comprises a generally planar proximal plate 701 flanked on each side by a generally planar medial plate 702. Proximal plate 701 is not co-planar with the two medial plates 702, but rather each medial plate 702 is joined along a line of intersection 753 with proximal plate 701. These two lines of intersection 753 may be formed by appropriately bending a single plate to form drop gear hanger 660 having the geometry shown in FIGS. 6A and 6B. Alternatively, separate plates 701, 702 may be joined together, as by welding; further, support gussets 703 can optionally be included, for example in the case where plates 701, 702 intersect at subtended angles substantially less than 180°.

To facilitate securing drop gear hanger 660 to ladder chassis 810, referring to FIGS. 6A-6B the edges of medial plates 702 distal from gearbox 1 are provided with mounting forks 704 (formed either by appropriately bending plate stock to form medial plates 702 and forks 704, or by joining separate fork pieces of appropriate geometry to medial plates 702, as by welding). Each mounting fork 704 has a slot 705 through which the frame of the ladder chassis 810 passes. In vehicle assembly, mounting forks 704 can be fastened to chassis 810, preferably by welding forks 704 to chassis 810. Alternatively, each mounting fork 704 can simply embrace the frame of chassis 810 as shown in FIGS. 6A-6B. In either alternative, the engine/gearbox combination will serve to increase the torsional rigidity of the ladder chassis proximate the driven wheels.

The exact mounting configuration employing the present invention varies in accordance with the structural configuration of the particular vehicle. The planar nature of the hanger designs herein facilitates mounting in a great variety of vehicle structural configurations and designs. For example, in addition to the examples above hangers 600 of the present invention can be used with a transaxle employed in a rear-engine, rear wheel drive configuration with the engine located to the rear of the passenger compartment and mounted rearward of the rear axle, and with the gearbox mounted forward of the engine. Hangers 600 can also be employed in a rear wheel drive transaxle configuration with the engine located ahead of the passenger compartment and the gearbox located to the rear of the passenger compartment. In such a configuration, the clutch housing 3 can be located with the engine forward of the passenger compartment, in which case first gearbox hanger may be mounted to the annular vertically-oriented contact surface at the front of gearbox 1. The invention additionally can be employed in a front-engine, rear-wheel drive configuration using an inline gearbox, such as the type disclosed in U.S. Provisional Patent Application No. 62/589,727, filed Nov. 22, 2017; the contents of that provisional application regarding the design of such an inline gearbox are hereby incorporated by reference as if fully set forth herein. Yet further, the invention can be employed in structural designs additional to those described in the examples herein, such as unibody and subframe designs.

The foregoing detailed description is for illustration only and is not to be deemed as limiting the inventions, which are defined in the appended claims.

What is claimed is:

1. A combination adapted for mounting to the structural load-bearing components of a vehicle, comprising:
an engine having a first contact surface;
a gearbox clutch housing having a second contact surface, the first contact surface of the engine and the second contact surface of the gearbox clutch housing each configured to permit a power transmission shaft to pass between them, the first and second contact surfaces being joined to the other by mechanical fastening means;
a first hanger comprising a rigid plate positioned between the first contact surface of the engine and the second contact surface of the gearbox clutch housing;
the first hanger having first and second opposed first hanger load-transferring surfaces of closed perimeter, with the first of the first hanger load-transferring surfaces in pressing contact with the first contact surface of the engine and the second of the first hanger load-transferring surfaces in pressing contact with the second contact surface of the gearbox clutch housing;
the first hanger including one or more first hanger load-supporting members extending beyond the perimeter of the opposed first hanger load-transferring surfaces;
the one or more first hanger load-supporting members including plural spaced-apart fastening elements adapted for coupling to one or more select first structural load-bearing components of the vehicle;
a gearbox joined to the gearbox clutch housing; and
a second hanger secured to a portion of the gearbox distal from the first hanger, the second hanger comprising a unitary rigid plate including (i) a generally planar second hanger load-transferring surface having a boundary, said second hanger load-transferring surface having a first fastening aperture that receives a fastener to fasten the second hanger load-transferring surface to said portion of the gearbox, and (ii) a generally planar second hanger load-supporting member in a parallel relationship with the generally planar second hanger load-transferring surface, the second hanger load-supporting member extending beyond the boundary of the second hanger load-transferring surface and including a second fastening aperture adapted for coupling to a select second structural load-bearing component of the vehicle distal from the one or more select first load-bearing components of the vehicle.

2. The combination as in claim 1, wherein:
the second hanger has a V-shape, with a first base region and first and second leg regions respectively having first and second terminal portions, and the second hanger load-transferring surface is located proximate to the first base region;
the second fastening aperture is positioned proximate the first terminal portion; and
a third fastening aperture, adapted for coupling to the select second structural load-bearing component of the vehicle, is positioned proximate the second terminal portion.

3. The combination as in claim 2, further comprising:
a third hanger comprising a unitary rigid plate positioned on a portion of the gearbox distal from the first hanger and including (i) a generally planar third hanger load-transferring surface having a boundary, said third hanger load-transferring surface being fastened to said portion of the gearbox, and (ii) a generally planar third hanger load-supporting member extending beyond the boundary of the third hanger load-transferring surface; wherein
the third hanger has a V-shape, with a second base region and third and fourth leg regions respectively having third and fourth terminal portions, and the third hanger load-transferring surface is located proximate to the second base region;
a fourth fastening aperture, adapted for coupling to a select third structural load-bearing component of the vehicle, is positioned proximate the third terminal portion; and
a fifth fastening aperture, adapted for coupling to the select third structural load-bearing component of the vehicle, is positioned proximate the fourth terminal portion.

4. The combination as in claim 1, further comprising:
an ovoid contact surface located on the gearbox distal from the gearbox clutch housing; and wherein
the boundary of the second hanger load-transferring surface forms a closed perimeter defining an interior aperture for forming a mating relationship with the gearbox, the second hanger load-transferring surface being secured to the ovoid contact surface of the gearbox.

5. A mounting system for an engine, a gearbox clutch housing and a gearbox in combination, the combination having a first portion having a first contact surface and a second portion having a second contact surface, the first contact surface and the second contact surface each being joined to the other by mechanical fastening means, the mounting system comprising:
a first hanger comprising a rigid plate adapted to be positioned between the first contact surface of the first portion and the second contact surface of the second portion;
the first hanger having first and second opposed first hanger load-transferring surfaces of closed perimeter, with the first of the first hanger load-transferring surfaces in pressing contact with the first contact surface of the first portion and the second of the first hanger load-transferring surfaces in pressing contact with the second contact surface of the second portion;
the first hanger including one or more first hanger load-supporting members extending beyond the perimeter of the opposed first hanger load-transferring surfaces;
the one or more first hanger load-supporting members including plural spaced-apart fastening elements adapted for coupling to one or more select first structural load-bearing components of the vehicle; and
a second hanger adapted to be secured to a third portion of the combination distal from the first contact surface and the second contact surface, the second hanger comprising a unitary rigid plate including (i) a generally planar second hanger load-transferring surface having a boundary, said second hanger load-transferring surface having a first fastening aperture adapted to receive a fastener to fasten the second hanger load-transferring surface to the third portion of the combination, and (ii) a generally planar second hanger load-supporting member in a parallel relationship with the generally planar second hanger load-transferring surface, the second hanger load supporting member extending beyond the boundary of the second hanger load-transferring surface and including a second fastening aperture adapted for coupling to a select second structural load-bearing component of the vehicle distal form the one or more select first load-bearing components of the vehicle.

6. A combination adapted for mounting to the structural load-bearing components of a vehicle, comprising:
an engine having a first contact surface;
a gearbox clutch housing having a second contact surface, the first contact surface of the engine and the second contact surface of the gearbox clutch housing each configured to permit a power transmission shaft to pass between them, the first and second contact surfaces being joined to the other by mechanical fastening means;
a first hanger comprising a rigid plate positioned between the first contact surface of the engine and the second contact surface of the gearbox clutch housing;
the first hanger having first and second opposed first hanger load-transferring surfaces of closed perimeter, with the first of the first hanger load-transferring surfaces in pressing contact with the first contact surface of the engine and the second of the first hanger load-transferring surfaces in pressing contact with the second contact surface of the gearbox clutch housing;
the first hanger including one or more first hanger load-supporting members extending beyond the perimeter of the opposed first hanger load-transferring surfaces;
the one or more first hanger load-supporting members including a first plurality of spaced-apart fastening elements adapted for coupling to one or more first select structural load-bearing components of the vehicle;
the gearbox having a mounting ring distal from the gearbox clutch housing; and
a second hanger comprising a rigid plate that includes (i) a generally planar second hanger load-transferring surface having a closed perimeter that defines an interior aperture for forming a mating relationship with the gearbox, the second hanger load-transferring surface being secured to the gearbox mounting ring, and (ii) a generally planar second hanger load-supporting member extending beyond the perimeter of the second hanger load-transferring surface and including a second plurality of spaced-apart fastening elements adapted for coupling to a select second structural load-bearing component of the vehicle distal from the one or more select first structural load-bearing components.

7. A combination comprising:
an engine having a first contact surface;
a gearbox clutch housing having a second contact surface, the first contact surface of the engine and the second contact surface of the gearbox clutch housing each configured to permit a power transmission shaft to pass between them, the first and second contact surfaces being joined to the other by mechanical fastening means;
a primary hanger comprising a rigid plate positioned between the first contact surface of the engine and the second contact surface of the gearbox clutch housing;
the primary hanger having first and second opposed primary hanger load-transferring surfaces of closed perimeter, with the first of the primary hanger load-transferring surfaces in pressing contact with the first contact surface of the engine and the second of the primary hanger load-transferring surfaces in pressing contact with the second contact surface of the gearbox clutch housing;
the primary hanger including a first primary hanger load-supporting member extending beyond the perimeter of the primary hanger load-transferring surfaces and a second primary hanger load-supporting member extending beyond the perimeter of the primary hanger load-transferring surfaces;
a space frame chassis having a first tubular member positioned on a first side of the space frame chassis and a second tubular member positioned on a second side of the space frame chassis in an opposing relationship with the first tubular member, with the first tubular member provided with a fastening aperture, and the second tubular member provided with a plurality of spaced-apart fastening apertures;
the first primary hanger load-supporting member provided with a fastening aperture positioned to correspond with the fastening aperture of the first tubular member, and the second primary hanger load-supporting member provided with plural spaced-apart fastening apertures each positioned to correspond with a respective one of the plurality of spaced-apart fastening apertures of the second tubular member; and
a fastening element received in the pair of corresponding fastening apertures of the first primary hanger load-supporting member and the first tubular member, and a fastening element received in each of the pairs of corresponding fastening apertures of the second primary hanger load-supporting member and the second tubular member.

8. The combination as in claim 7, further comprising:
a gearbox joined to the gearbox clutch housing; and
a secondary hanger secured to a portion of the gearbox distal from the gearbox clutch housing, the secondary hanger comprising a rigid plate including (i) a generally planar secondary hanger load-transferring surface having a boundary, said secondary hanger load-transferring surface being fastened to said portion of the gearbox, and (ii) a generally planar secondary hanger load-supporting member in a parallel relationship with the generally planar secondary hanger load-transferring surface;
the secondary hanger including a first secondary hanger load supporting member extending beyond the boundary of the secondary hanger load-transferring surface and a second secondary hanger load supporting member extending beyond the boundary of the secondary hanger load-transferring surface;
the space frame chassis having a third tubular member positioned on the first side of the space frame chassis and a fourth tubular member positioned on the second side of the space frame chassis in an opposing relationship with the third tubular member, the first and second tubular members being longitudinally distal from the third and fourth tubular members;
the third tubular member provided with a fastening aperture, and the fourth tubular member provided with a fastening aperture;
the first secondary hanger load-supporting member provided with a fastening aperture positioned to correspond with the fastening aperture of the third tubular member, and the second secondary hanger load-supporting member provided with a fastening aperture positioned to correspond with the fastening aperture of the fourth tubular member; and
a fastening element received in the pair of corresponding fastening apertures of the first secondary hanger load-supporting member and the third tubular member, and a fastening element received in the pair of corresponding fastening apertures of the second secondary hanger load-supporting member and the fourth tubular member.

* * * * *